US012412384B2

(12) United States Patent
Nyamwange et al.

(10) Patent No.: US 12,412,384 B2
(45) Date of Patent: Sep. 9, 2025

(54) AUTOMATED IMAGE DETECTION UTILIZING A CONVOLUTIONAL XGBOOST IMAGE RECOGNITION MACHINE LEARNING MODEL ON EDGE COMPUTING WITH BLOCKCHAIN MOBILE AUTHENTICATION

(71) Applicant: Bank of America Corporation, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Phadnis, Charlotte, NC (US); Rahul Yaksh, Austin, TX (US); Hari Vuppala, Charlotte, NC (US); Pratap Dande, St. Johns, FL (US); Brian Jacobson, Los Angeles, CA (US); Erik Dahl, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 312 days.

(21) Appl. No.: 18/227,338

(22) Filed: Jul. 28, 2023

(65) Prior Publication Data
US 2025/0037447 A1    Jan. 30, 2025

(51) Int. Cl.
*G06V 10/82* (2022.01)
*G06V 10/75* (2022.01)
(Continued)

(52) U.S. Cl.
CPC ............ *G06V 10/82* (2022.01); *G06V 10/751* (2022.01); *G06V 10/774* (2022.01); *G06V 10/94* (2022.01);
(Continued)

(58) Field of Classification Search
None
See application file for complete search history.

(56) References Cited

U.S. PATENT DOCUMENTS

| 2023/0230085 A1* | 7/2023 | Turgeman | G06Q 20/10 |
| 2024/0169759 A1* | 5/2024 | Bhamidipati | G06V 40/40 |
| 2025/0217016 A1* | 7/2025 | Pham | G06N 3/045 |

OTHER PUBLICATIONS

Chen et al. "XGBoost: A Scalable Tree Boosting System", KDD '16: Proceedings of the 22nd ACM SIGKDD International Conference on Knowledge Discovery and Data Mining, pp. 785-794 (Year: 2016).*

(Continued)

*Primary Examiner* — Gregory A Morse
(74) *Attorney, Agent, or Firm* — Weiss & Arons LLP (57) ABSTRACT

An apparatus may include conduction of a secure transfer at a point of identification using image recognition and blockchain authentication. The apparatus may include a computer processor, a camera, an image capturing machine, a reference database, an XGBoost image recognition machine learning model, and a blockchain. The computer processor may be an edge computing device. The computer processor may be configured to identify a user at a point of identification by capturing an image, running the Features detection engine to identify sets of features, running the XGBoost image recognition machine learning model to identify labels in the sets of features, and matching the sets of features and labels to a record in the reference database. The computer processor may further be configured to seek user approval on the user's portable device before providing the transfer. Once the user has approved the transfer, the transfer may be recorded in the blockchain.

20 Claims, 6 Drawing Sheets (51) Int. Cl.
  *G06V 10/774* (2022.01)
  *G06V 10/94* (2022.01)
  *G06V 20/50* (2022.01)
  *G06V 40/10* (2022.01)
  *G06V 20/40* (2022.01)

(52) U.S. Cl.
  CPC .............. *G06V 20/50* (2022.01); *G06V 40/10* (2022.01); *G06V 20/46* (2022.01); *G06V 20/48* (2022.01)

(56) References Cited

OTHER PUBLICATIONS

Hajek et al., "Fraud Detection in Mobile Payment Systems using an XGBoost-based Framework", Inf Syst Front. Oct. 14, 2022:1â19 (Year: 2022).*

"A comparison of blockchain network latencies", Jun. 20, 2022, downloaded from https://medium.com/klaytn/a-comparison-of-blockchain-network-latencies-7508509b8460 (Year: 2022).*

Sharma et. al., "Computational Intelligence for Cybersecurity Management and Applications", CRC Press, pp. 65-81, Apr. 27, 2023 ( Year: 2023).*

"About AUC", downloaded from https://aucunited.com/about.html (Year: 2024).*

"Blockchain payment service for underbanked in Africa adds facial recognition", downloaded from https://www.biometricupdate.com/202308/blockchain-payment-service-for-underbanked-in-africa-adds-facial-recognition, Aug. 2023 (Year: 2023).*

* cited by examiner

AUTOMATED IMAGE DETECTION UTILIZING A CONVOLUTIONAL XGBOOST IMAGE RECOGNITION MACHINE LEARNING MODEL ON EDGE COMPUTING WITH BLOCKCHAIN MOBILE AUTHENTICATION

FIELD OF TECHNOLOGY

Aspects of the disclosure relate to a secure transfer at a point of identification. Aspects of the disclosure relate to a secure transfer at a point of identification using image recognition and blockchain authentication.

BACKGROUND OF THE DISCLOSURE

Automation of processing provides convenience for users. Obstacles to automated processing include high latency and inaccurate correlation between a user and an account owned by the user at an enterprise.

Convolutional neural networks (CNN) require a lot of training data to be effective. CNNs fail to encode the position and orientation of objects. Hence CNNs tend to have higher latencies because of operations like maxpool and the training process could take a particularly long time if the computer does not have a good graphics processing unit (GPU). This may be an issue whereby image recognition is approximately 70% accurate. This degree of accuracy may slow down users at the point of identification. It may also drive them away from automated processing. An example of a point of identification is a point of service (POS). An example of automated processing may be automated payment processing.

A further issue encountered with increased automation involving a user may include security concerns. Sometimes personal information such as a phone number or an email address may be required to complete a transfer.

There is a need for an automated transfer processing apparatus, methods, and system that reduces latency.

There is a need for an automated transfer processing apparatus, methods, and system that provides increased security.

There is a need for an automated transfer processing apparatus, methods, and system that achieves high accuracy.

SUMMARY OF THE DISCLOSURE

Provided are apparatus, methods, and systems that automate processing of a transfer and reduce latency.

Provided are apparatus, methods, and systems that automate processing of a transfer and increase security.

Provided are apparatus, methods, and systems that automate processing of a transfer and maintain high accuracy.

Apparatus, methods, and systems for conducting secure transfers are provided. The method for conducting a secure transfer may include conducting a secure transfer at a point of identification using image recognition and blockchain authentication.

The method may include receiving, at a computer processor, an identity of a user and details relating to an intended transfer by the user at a point of identification. The method may include capturing an image of the user at the point of identification. The method may include using a computer processor to condition data containing images of people. The computer processor may use an image processor to condition data containing images of people.

The method may include identifying, with the computer processor running a Features detection engine, sets of features in the image of the user. The method may include running, using the computer processor, an XGBoost image recognition machine learning model to associate labels with sets of features identified in the image of the user.

The method may include where the XGBoost image recognition machine learning model uses convolutional neural network (CNN). The method may include where the image recognition machine learning model uses extreme gradient boosting (XGBoost).

The method may include using the computer processor to match the user with a record in a reference database. The method may include using the computer processor running the XGBoost image recognition machine learning model to match the user with a record in a reference database. The match may be made by comparing sets of features identified in the image of the user and the labels associated with sets of features identified in the image of the user by the XGBoost image recognition machine learning model to records in the reference database. Each record may include one or more images of a person. Each record may include sets of features identified in the images. Each record may include labels associated with the sets of features.

The method may include using the computer processor to send a request to an institution where the user has an account. The institution may be an enterprise. The institution may be a data supplier. The institution may be a data receiver. The institution may be a financial institution, such as a bank and/or a credit card issuer. The institution may provide the user with a secure portal to approve a transfer.

The method may include receiving, at the computer processor, a transfer from the institution. The transfer may be a transfer of information. The transfer may be a transfer of funds. The transfer may indicate user approval. The transfer may indicate institution approval. The approval by the user and/or the institution may be an approval to transfer information. The approval may be an approval to transfer funds.

The method may include a method that does not require a user to provide a phone number during the transfer approval process. The method may include a method that does not require a user to provide an email address during the transfer approval process.

The method may include using the computer processor to request the creation of a new block on a blockchain indicating completion of the transfer. The transfer may be a transfer of information. The transfer may be a transfer of funds. The method may include receiving confirmation, at the computer processor, of the creation of the new block on the blockchain.

The method may include where the latency between sending a transfer request from the computer processor to an institution of the user and receiving transfer at the computer processor from the institution is 1 second or less.

The method may include where the latency between receiving, at the computer processor, an image of the user and details relating to an intended transfer by the user at a point of identification and receiving, at the computer processor, a transfer from the institution is 15 seconds or less.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Apparatus, methods, and systems for conducting secure transfers are provided. The method for conducting a secure transfer may include conducting a secure transfer at a point of identification using image recognition and blockchain authentication.

The method may include using a computer processor to train an extreme gradient boosting (XGBoost) image recognition machine learning model. XGBoost may include gradient boosting which may be a machine learning technique. Gradient boosting may combine weaker learning models into a single, stronger learning model. The stronger model may work by combining the weaker learning models as an ensemble which may function in an iterative fashion. The ensemble of weaker prediction models may have a decision-tree organization structure. Decision-tree learning may be a form of machine learning which functions as a predictive model to make conclusions based on a set of data and observations. XGBoost may be a software library which provides a regularizing gradient boosting framework. The XGBoost software library may provide a scalable, portable, and distributed gradient boosting Library. XGBoost may be an effective tool for making an image recognition model based on machine learning. The XGBoost image recognition machine learning model may identify sets of features in an image of user. The XGBoost image recognition machine learning model may identify labels that characterize the sets of features from the image of user. The sets of features and/or labels characterizing the sets of features may enable identification of a record from a set of records which most closely resembles the image of the user.

The method may include using a computer processor to train an extreme gradient boosting (XGBoost) image recognition machine learning model. The XGBoost image recognition machine learning model may be trained with two or more records. A record may include images of a person, sets of features identified in the images, and labels associated with the sets of features. The images may be a still picture. The images may be a video.

Image recognition may be used to analyze the images of the person. The image recognition may use extreme gradient boosting (XGBoost).

The method may include receiving, at the computer processor, an identity of the user. For example, the identity of the user may include the user's name. The method may include receiving, at the computer processor, details relating to an intended transfer by the user at a point of identification. The details may include the location of the point of identification.

When the transfer includes a transfer of funds, the details may include a purchase price. The point of identification may include a point of sale.

The method may include capturing an image of the user at the point of identification. The image may be a still picture. The image may be a video. A memory located in the computer may store the image. A memory located in proximity to the computer may store the image. A database may store the image.

Image recognition may facilitate analysis of the images of the user. The image recognition may use extreme gradient boosting (XGBoost). The image recognition may use convolutional neural network (CNN).

The method may include using a computer processor to condition data containing images of people. The computer processor may use an image processor to condition data containing images of people. The image processor may include an image processing engine. The image processor may include an image processing unit (IPU). The image processor may include an image signal processor (ISP). The image processor may be a type of media processor used to process images.

The method may include identifying sets of features in the image of the user. The method may include identifying, with the computer processor running a Features detection engine, sets of features in the image of the user. The method may include identifying, with the computer processor running an image recognition application, sets of features in the image of the user.

The method may include using the computer processor to run the XGBoost image recognition machine learning model to associate labels with the sets of features in the image of the user.

The method may include using the computer processor to match the user with a record in a reference database by comparing the sets of features identified in the image of the user and the labels associated with the sets of features identified in the image of the user by the XGBoost image recognition machine learning model to records in the reference database. The method may include using the computer processor running the image recognition machine learning model to match the user with a record in a reference database. Each record may include one or more images of a person, sets of features identified in the images, and labels associated with the sets of features.

The method may include where the user has a record in the reference database.

The method may include using a computer processor to send a request to an institution where the user has an account. The method may include the institution providing the user with a secure portal to approve the transfer. The method may include the user approving the transfer. The user may approve the transfer on the user's mobile device. The user may approve the transfer on a secure portal provided at the point of identification.

The institution may be a data provider. The institution may be a data storage location. The institution may be a financial institution. The institution may be a bank. The institution may be a credit card issuer where the user has an account. The institution may be a bank which may issue a credit card where the user has an account. The user may have an account at the institution.

The method may include receiving, at the computer processor, the transfer from the institution indicating approval of the transfer by the user and the institution.

The method may not require the user to provide a phone number during the transfer. The method may not require the user to provide an email address during the transfer. The method may not require the user to provide a phone number or an email address to an establishment at the point of identification. The method may include where the user provides a phone number or an email address in a secure portal with the institution as part of the approval process.

The method may include using the computer processor to request the creation of a new block on a blockchain indicating completion of the transfer.

The method may include receiving on the computer processor notification of the creation of a new block on the blockchain indicating completion of the transfer.

The method may include processing the transfer by edge computing. Edge computing may include processing the transfer near the point of identification. Edge computing may include reducing or eliminating the need to upload aspects of the transfer to the cloud. Processing the transfer by edge computing may reduce latency.

The method may include where the latency between sending, from the computer processor, a transfer request to an institution of the user and receiving, at the computer processor, the transfer from the institution is 5 seconds or less.

The method may include where the latency between sending, from the computer processor, a request to the institution of the user and receiving, at the computer processor, the transfer from the institution is 1 second or less.

The method may include where the latency between sending, from the computer processor, a transfer request to the institution of the user and receiving, at the computer processor, the transfer from the institution is 100 milliseconds or less.

The method may include where the latency between sending, from the computer processor, a transfer request to the institution of the user and receiving, at the computer processor, the transfer from the institution is 50 milliseconds or less.

The method may include where the latency between sending, from the computer processor, a transfer request to the institution of the user and receiving, at the computer processor, the transfer from the institution is 20 milliseconds or less.

The transfer request may include a request for data. The transfer may include a transfer of data. The transfer request may include a request for funds. The transfer may include a transfer of funds.

The method may include where the latency between receiving, at the computer processor, an image of the user and details relating to an intended transfer by the user at a point of identification and receiving, at the computer processor, the transfer of from the institution is 45 seconds or less.

The method may include where the latency between receiving, at the computer processor, an image of the user and details relating to an intended transfer by the user at a point of identification and receiving, at the computer processor, the transfer of from the institution is 30 seconds or less.

The method may include where the latency between receiving, at the computer processor, an image of the user and details relating to an intended transfer by the user at a point of identification and receiving, at the computer processor, the transfer of from the institution is 15 seconds or less.

The method may include where the latency between receiving, at the computer processor, an image of the user and details relating to an intended transfer by the user at a point of identification and receiving, at the computer processor, the transfer of from the institution is 5 seconds or less.

The method may include where the latency between receiving, at the computer processor, an image of the user and details relating to an intended transfer by the user at a point of identification and receiving, at the computer processor, the transfer of from the institution is 1 second or less.

The method may include where the latency between receiving, at the computer processor, an image of the user and details relating to an intended transfer by the user at a point of identification and receiving, at the computer processor, the transfer of from the institution is 100 millisecond or less.

Illustrative embodiments of apparatus and methods in accordance with the principles of the disclosure will now be described with reference to the accompanying drawings, which form a part hereof. It is to be understood that other embodiments may be utilized, and that structural, functional, and procedural modifications, additions or omissions may be made, and features of illustrative embodiments, whether apparatus or method, may be combined, without departing from the scope and spirit of the disclosure.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
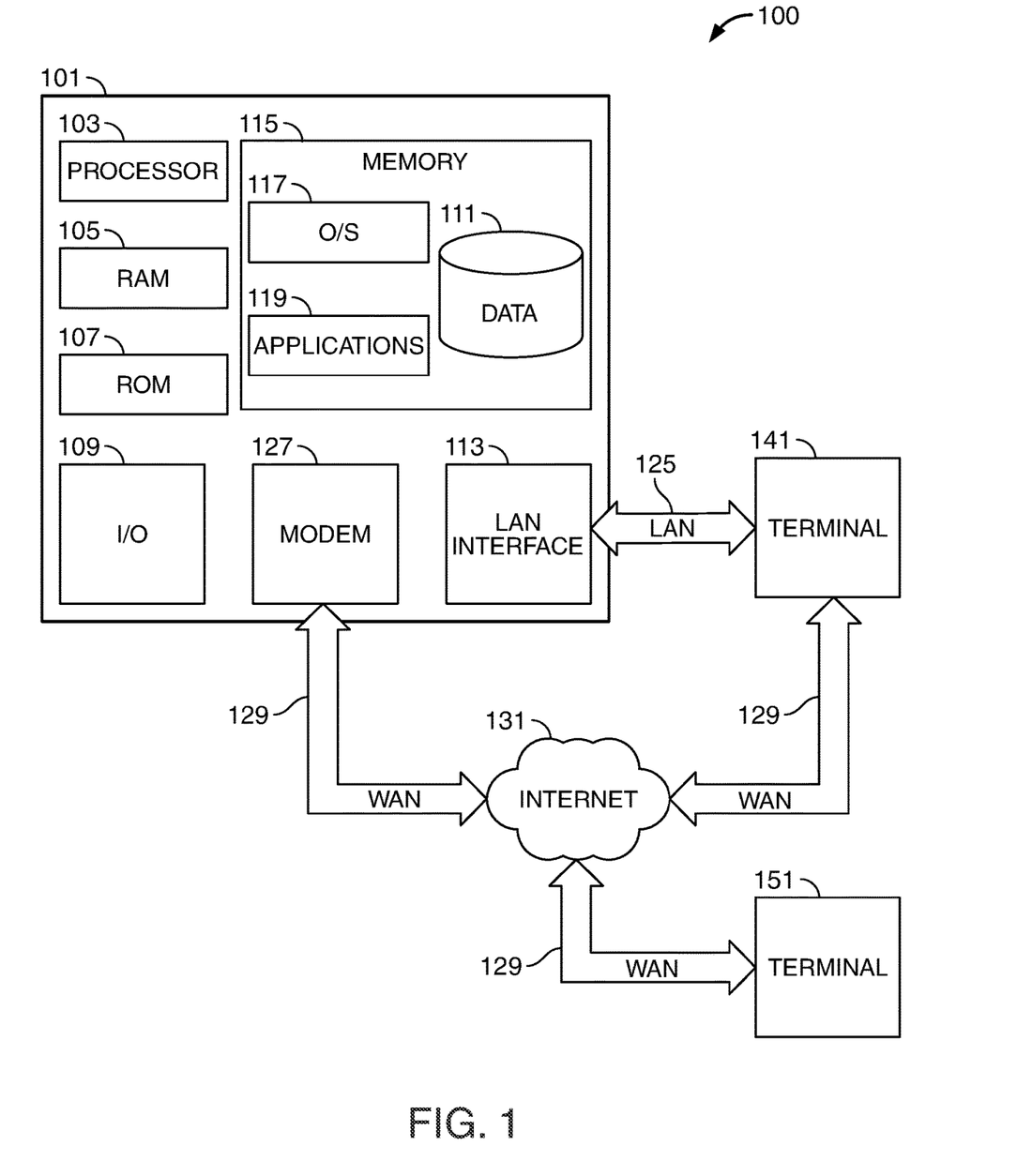
FIG. 1 shows an illustrative block diagram in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments where tasks are performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement particular data types. The invention may also be practiced in distributed computing environments where tasks are performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
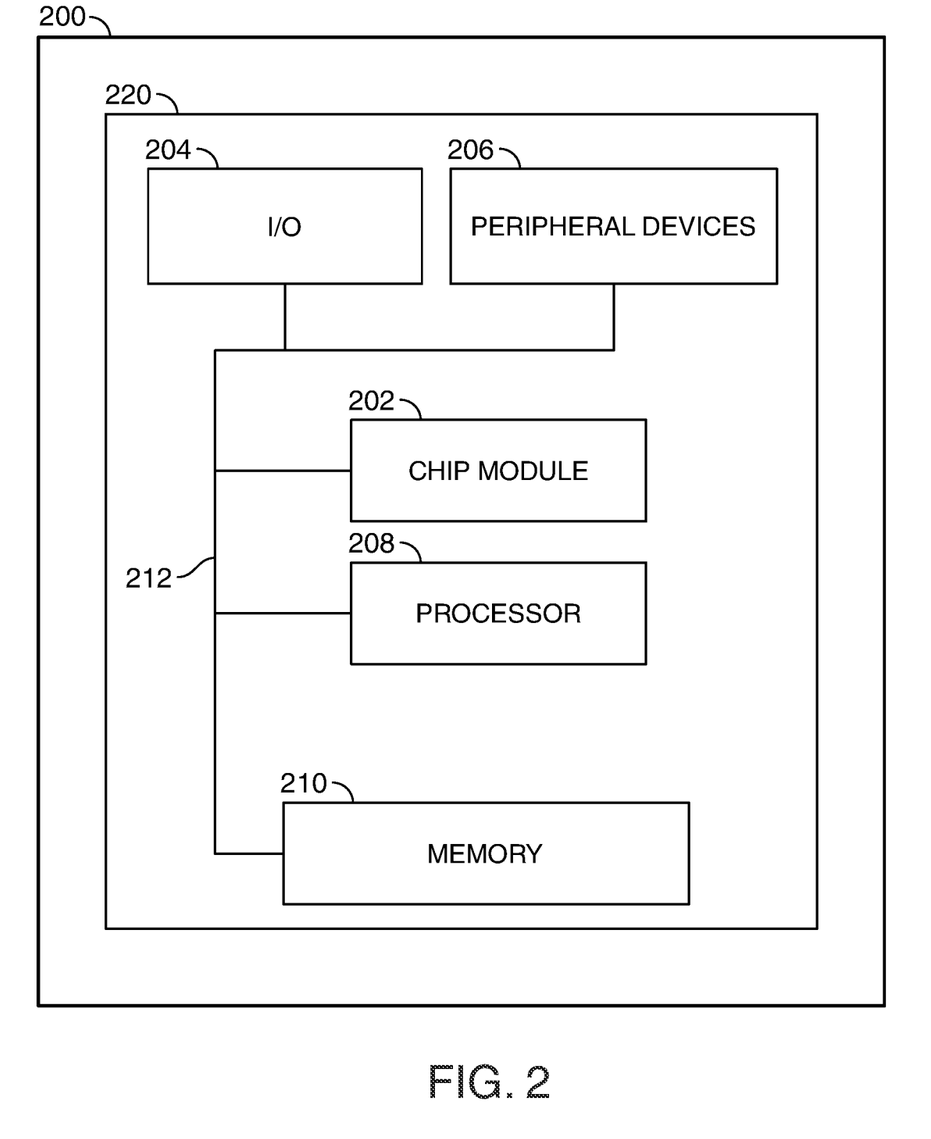
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
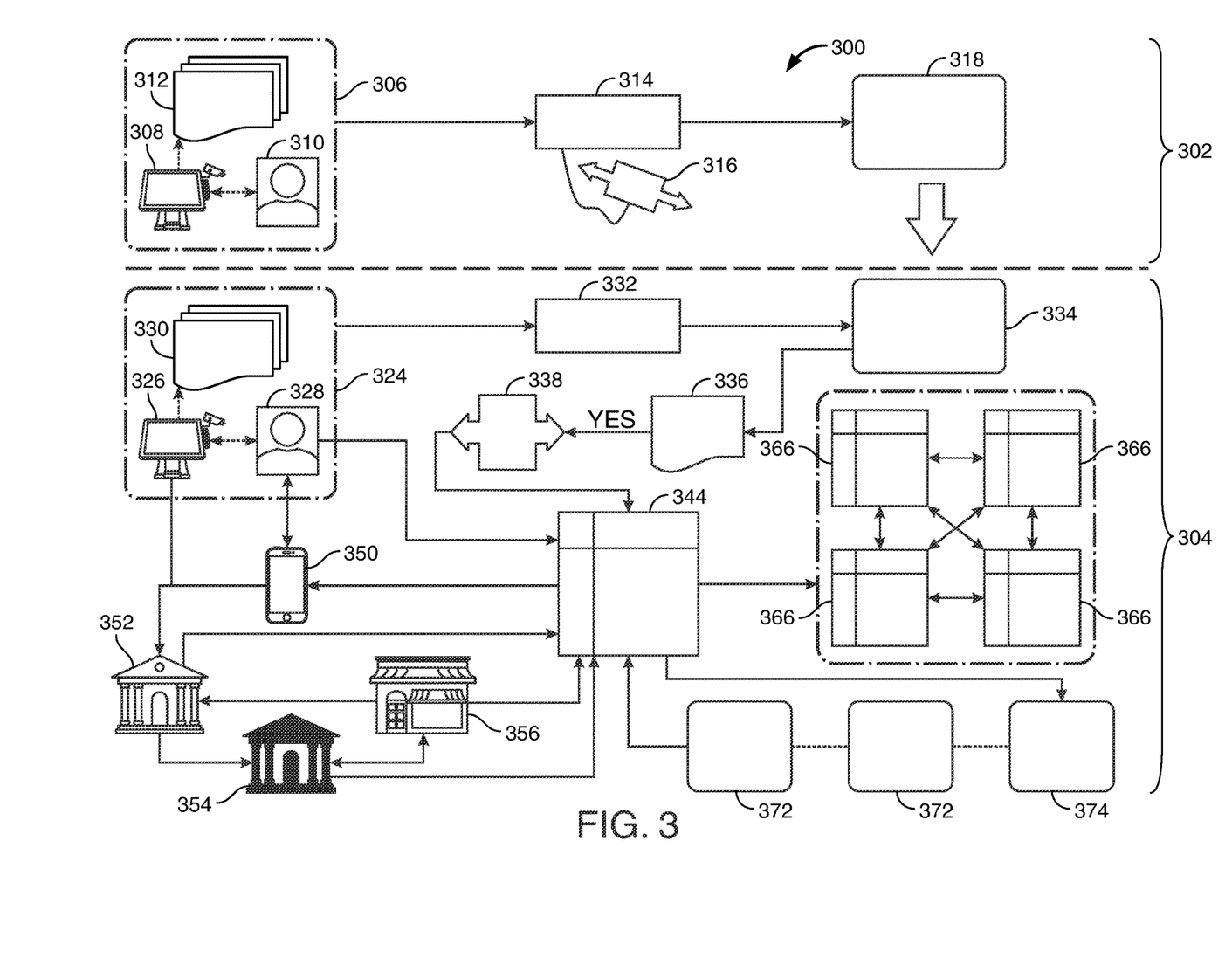
FIG. 3 shows an illustrative block diagram in accordance with principles of the disclosure.

FIG. 3 shows illustrative block diagram 300. Block diagram 300 may illustrate an apparatus for completing a transfer at a point of identification. The transfer may include a transfer of data. The transfer may include a transfer of funds and the point of identification may be a point of sale (POS). Block diagram 300 may illustrate an apparatus for automated processing with the XGBoost image recognition machine learning model. Block diagram 300 may illustrate an apparatus for automated processing with the XGBoost image recognition machine learning model enhanced by use of convolutional neural networks (CNN). Automated processing may include automated data transfer. Automated processing may include automated payment processing. Block diagram 300 may illustrate an apparatus for processing a transfer using edge computation. Edge computation may offer an advantage of higher speed and less latency as compared to transferring data to the Cloud. When transferring data to the Cloud, there may be a wait time between a request for approval and the request being processed.

To provide extra security for the XGBoost-facilitated transfer, an extra step may be added which requires user approval before processing the transfer. One approach to adding an extra step to increase security of the transfer may be to use proof of stake (POS) blockchain mobile authentication.

Another approach may involve the user providing their phone number and/or email address. The user then may receive a token on the user's device which they must approve. A downside to sharing one's phone number and/or email address may be additional security risk exposure. A user may not want to share this personal information. Furthermore, sharing one's phone number and/or email address may delay the transfer. Sometimes a text to the phone or an email to a smartphone may get delayed or lost in transit. Another downside is that the user may forget their email address.

Block diagram 300 may illustrate a system, application, and/or computer for processing a transfer. The transfer may be processed using edge computation. Block diagram 300 may take an image and/or a video of a user to authenticate their identity. The user's image and/or video may be associated with an account of the user. Block diagram 300 may be used to authenticate a user who is making a request for a transfer by providing details of the user's request. The XGBoost image recognition machine learning model may process the images and/or videos of the user. The XGBoost image recognition machine learning model may provide the identity of the user, allowing confirmation of an alleged identity presented by the user. For example, if the user has been onboarded to the XGBoost system, then recognition of the user by the XGBoost system may lead to approving a transfer.

The transfer request may be authenticated by providing a location of the user and comparing it to the location of the point of identification. If the two are within a certain distance, then the transfer may be approved. If the two are within a certain distance, then a secondary security requirement may be met. A computer processor may obtain final approval for the transfer from the user.

As an added security feature, the system may require final approval by providing the user a secure portal to approve the transfer. The portal may be provided on the user's mobile device. The portal may be provided at the point of identification on a secure portal. The user may approve the transfer by tapping on his mobile device or the secure portal provided at the point of identification. The secure portal may be provided using proof of state (POS) blockchain. In either situation, the user may not have to share his phone number, email address, or login credentials to an account with an institution, thereby providing additional security without additional exposure.

Training phase 302 may use a convolutional neural network (CNN) to train the XGBoost image recognition machine learning model. The XGBoost image recognition machine learning model may build upon supervised machine learning, decision trees, ensemble learning, gradient boosting, or any combination herein. During training phase 302, image data collection 306 may collect images of people. An image attainment device 308 may collect images of people 310. The images may be photographs. The images may be a video. The images of people 310 may be stored as image data for training 312. Image data collection 306 may condition the data.

Data from image data collection 306 may be provided to a Features detection engine 314. Features detection engine 314 may identify features in the images of people 310 and label 316 those features. For example, supervised machine learning may use algorithms to train the model to find image patterns in the dataset such as features. Features may be shape, color, size, and other characteristics found in the image data for training 312. Label identifier 316 may organize a group of features into a set of features and assign to them a label. A label may be a name and/or other personal identifiers of a person. The image data for training 312 which may include features and labels may be used to train an image recognition machine learning model 318. XGBoost image recognition machine learning model 318 may find image patterns in a dataset with features and labels. The XGBoost image recognition machine learning model 318 may be a predictive model that can identify a person based on their features. The XGBoost image recognition machine learning model 318 may be able to identify a label after looking at sets of features. The XGBoost image recognition machine learning model 318 may use CNN to operate.

Predicting phase 304 may use CNN to operate the XGBoost image recognition machine learning model 334. The XGBoost image recognition machine learning model 334 may be built upon supervised machine learning, decision trees, ensemble learning, gradient boosting, or any combination herein. The XGBoost image recognition machine learning model 334 may predict, based on features of a person's image, a label which may be a person's name. Image recognition machine learning model 334 may utilize decisions trees to predict labels by evaluating features using a decision tree using if-then-else true/false statements. The decision tree may estimate the minimum number of questions needed to assess the probability of making a correct decision. Classification of the image may be based on decision tree scores assigned during the prediction.

Data from image data collection 324 may be provided to a features detection engine 332. For example, a user 328 wanting to make a transfer at an establishment may have his picture and/or video taken at a terminal at the establishment, which may include image attainment device 326. The user may want to transfer data to the establishment. The user may want to transfer funds to the establishment, for example, to complete a purchase of goods or services. The image processor 330 may analyze the image and prepare the data for further analysis by features detection engine 332 which identifies features to characterize the image or short video. The XGBoost image recognition machine learning model 334 may receive the data from features detection engine 332 to run its model and provide labels relating to sets of features. The XGBoost image recognition machine learning model 334 may be a highly accurate tool for identifying labels related to features identified in the picture and/or video of user 328.

The image data for training 312 may also serve as a reference database 336 for checking the accuracy of the XGBoost image recognition machine learning model 334.

A computer processor may predict the identity of the user 328 by searching reference database 336 for the sets of features and labels detected for user 328. The computer processor may provide a score that estimates the accuracy of a record found in reference database 336 with user 328. If the score is high enough, it may indicate a high probability that user 328 is properly representing their identity. When the probability is high enough, the computer processor may prompt transfer generator 338 regarding a desired transfer. The transfer may be a transfer of data from user 328 to another party. The transfer may be a transfer of data from another party to user 328. The transfer may be a transfer of funds from user 328 to another party such as an establishment providing goods and/or service.

When transferring data, transfer generator 338 may send a request to node 344 to create a new block in the existing blockchain indicating the completion of the transfer. Before node 344 creates a new block, node 344 may send an approval request for a new block creation to the user's personal device 350. Node 344 may send an approval request to image attainment device 326, which may also serve as a terminal for approval by user 328.

When transferring funds, Node 344 also may send the generated transfer request to establishment gateway 354 to process the transfer. Establishment gateway 354 may inquire of the user's institution 352 to confirm if sufficient funds are available to make the transfer. User's institution 352 may confirm with node 344 that sufficient funds are available. In the meanwhile, user 328 may receive a token and approve the transfer through the user's personal device 350. User 328 may receive a request to approve and may approve the transfer through the user's personal device 350. User 328 may also receive the token and approve the transfer through a secure portal on the image attainment device 326. User 328 may receive a request to approve and may approve the transfer through a secure portal on the image attainment device 326. The approval may be sent to user's institution 352 to make a transfer to establishment 356.

Node 344 is informed of the approval and completion of the transfer. Node 344 broadcasts the completion of the transfer to other nodes 366 in the blockchain. Node 344 then creates a new block 374 and adds it to blocks in the existing blockchain 372. While user's institution 352, establishment gateway 354, and establishment 356 may also be members of the blockchain, user 328 is the largest stakeholder with the main approval, including the main approval token. The new block 374 helps to trace the new transfer.

Figure 4:
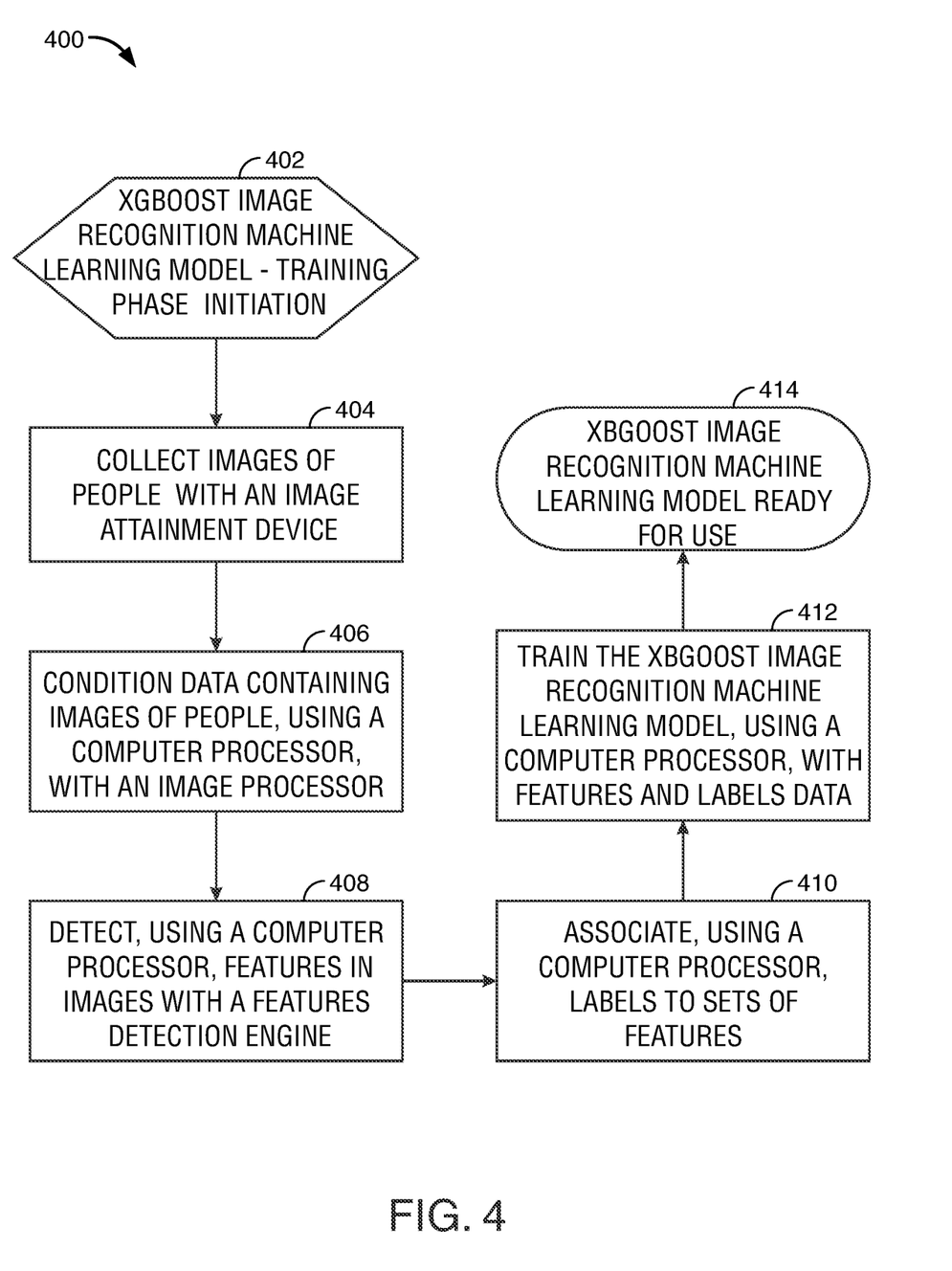
FIG. 4 shows an illustrative flowchart in accordance with principles of the disclosure.

FIG. 4 shows illustrative flowchart 400. Flowchart 400 may illustrate a method for training an XGBoost image recognition machine learning model. XGBoost image recognition machine learning model training phase initiation may begin at step 402. At step 404, an image attainment device may collect images of people. At step 406, a computer processor may condition data containing images of people with an image processor. At step 408, a computer processor may detect features in images with a features detection engine. At step 410, a computer processor may assign labels to sets of features using a label identifier. At step 412, a computer processor may train an XGBoost image recognition machine learning model with the features and labels data. At step 414, the XGBoost image recognition machine learning model may be ready for use.

Figure 5A:
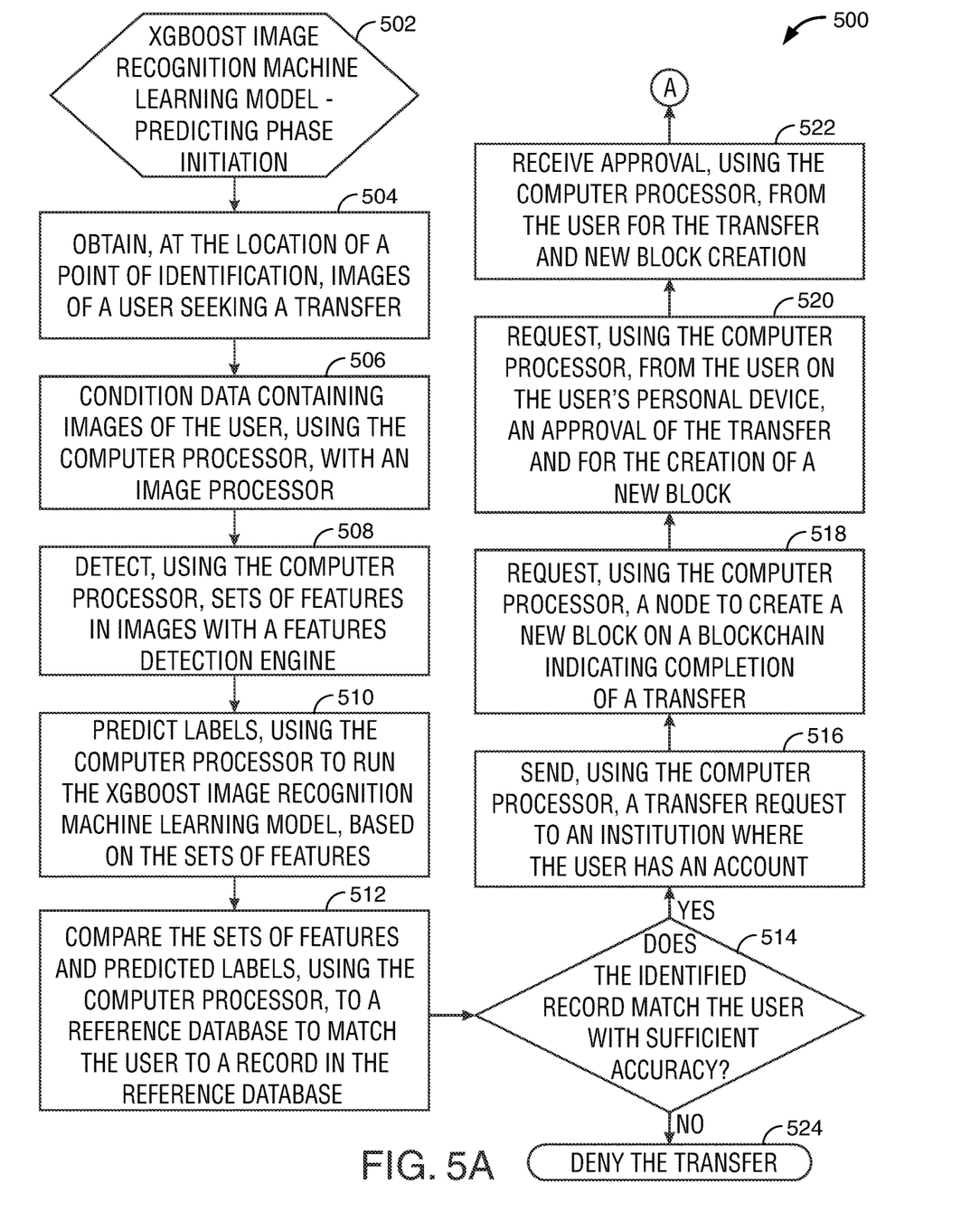
FIG. 5A shows an illustrative flowchart in accordance with principles of the disclosure.

FIG. 5A shows illustrative flowchart 500. Flowchart 500 may illustrate a method for using an XGBoost image recognition machine learning model to predict an identity of a person, such as a user. The XGBoost image recognition machine learning model predicting phase initiation may begin at step 502. At step 504, an image collection device may obtain images of a user seeking a transfer. The transfer may be a transfer of data. The transfer may be a transfer of goods or services. At step 506, a computer processor may condition data containing images of the user with an image processor. At step 508, a computer processor may detect features in images with a features detection engine. At step 510, a computer processor running an XGBoost image recognition machine learning model may predict labels based on the sets of features. At step 512, the computer processor may compare the sets of features and predicted labels to a reference database to match the user to a record in the reference. At step 514, a computer processor may determine if the identified record matches the user with sufficient accuracy. At step 524, if the record does not match the user with sufficient accuracy, the transfer may be denied.

At step 516, if the record does match the user with sufficient accuracy, a computer processor may send a transfer request to an institution where the user has an account. The transfer request may be to transfer data. The institution may be any institution that may store data which the user may find useful. The transfer request may be to transfer funds. The institution may be a financial institution such as a bank.

At step 518, a computer processor may request a node to create a new block on a blockchain indicating the completion of a transfer. At step 520, a computer processor may send a request from the node to the user's personal device for an approval of the transfer and creation of a new block chain. At step 522, a computer processor may receive approval for the transfer and new block creation from the user using their personal device. Step 522 may continue to step 526 in FIG. 5B.

Figure 5B:
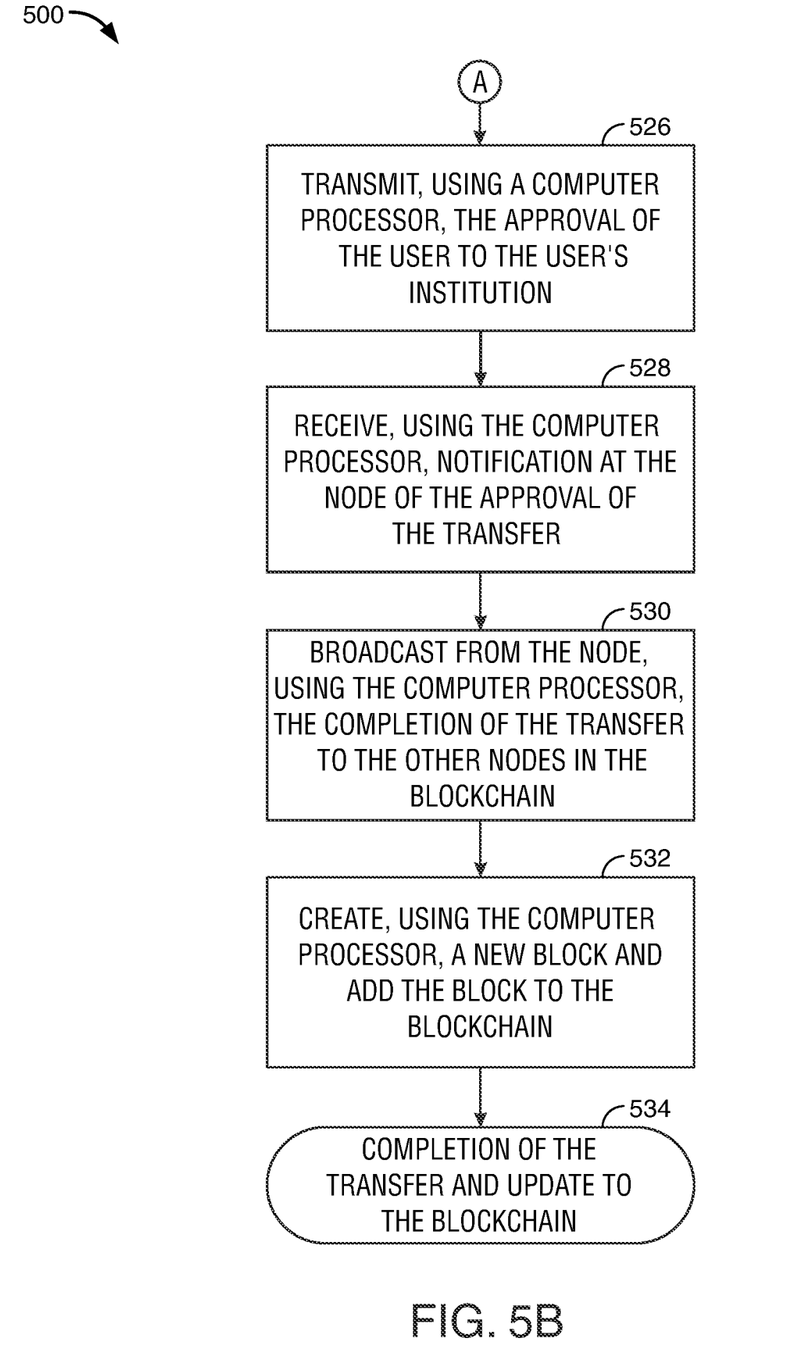
FIG. 5B shows an illustrative flowchart in accordance with principles of the disclosure.

FIG. 5B may continue illustrative flowchart 500, which began in FIG. 5A.

After step 522 in FIG. 5A, continuing in FIG. 5B at step 526, the computer processor may transmit the approval of the transfer to the user's institution.

At step 528, the computer processor may receive notification at the node of the approval of the transfer. At step 530, the computer processor may broadcast, from the node, the completion of the transfer to other nodes in the blockchain.

At step 532, a computer processor may create a new block and add the block to the blockchain to provide evidence of the new transfer. At step 534, the transfer is completed and the blockchain is updated.

The disclosed apparatus and methods may provide for a quick transfer by combining XGBoost facial recognition with seeking user approval to process the transfer and create a block on the blockchain. A user's ability to approve or decline the final transfer provides security to the transfer. This apparatus and methods may have less latency than other facial recognition techniques. The security of the disclosed apparatus may also be improved compared to other methods due to the user controlling the approval of the final transfer. Additionally, the creation of the block in the blockchain may be a security feature that keeps the transfer in check.

The disclosed apparatus and methods may provide additional security measures which may enhance security. One additional security measure may be to integrate a user device's biometrics into the approval process. A user's mobile device may already have biometrics embedded. Biometrics may be coupled to approving the token by requiring the user to use a biometric to log into user's mobile device together with approving the token for the transfer on the mobile application. Requiring a biometric to log into the user's mobile device may prevent another party from approving a transfer from the device without the user's consent. Biometrics may include the user's fingerprint. Biometrics may include the user's eyes. Biometrics may be part of the method of approval of the transfer. For example, before proceeding with the transfer on the application on the mobile device, the user may enter his biometric of choice. The user may then also approve the transfer on the application. The user may also approve the transfer with the act using the biometric.

A further security measure may be location. In addition to requiring the user to approve the token on the application on the user's mobile device, calculation of a location of the device may confirm that the device is in proximately of the point of identification. For example, the point of identification may be in proximately to a modem to show its precise location. Cell phone tower triangulation may show a precise location of the user. The user's mobile device and the point of identification may be required to be within a certain distance of each other to process the transfer. User approval on the application on the mobile device may also be required.

Benefits of the apparatus and method include the following.

The apparatus and method may be more secure with an added point of identification feature that gives the user the final right to approve transfer on their mobile device. The apparatus and method may also be safer than other technologies in that other technologies require sharing a phone number or an email address for the user to provide. Sharing this personal information may expose the user to security risk. There also may be concerns that an imposter can provide their own phone number or email address. The disclosed apparatus and method may not require the user to share either the user's phone number or email address.

The apparatus and method may be quick and efficient since users may complete the transfer from their mobile phone only on the final approval. For example, the apparatus and method may achieve the security of facial recognition while maintaining speed commonly associated non-facial recognition approval apparatus and methods. The apparatus and method may increase efficiency and speed of processing at the point of identification. Other facial recognition approaches may require more time to complete the transfer. This may be due to slower recognition time that the disclosed apparatus and method. Other techniques using a mobile phone for approval may require multiple steps using the mobile phone providing a phone number or email address, receiving a text message or email, and approving the transfer by text or email. This approach may cause delay due to requiring that the phone number and email address be provided to another party at the point of identification or entered into another party's terminal. The user may need to wait to receive the text or email. The user may need to respond to the text or email to provide approval of the transfer. These steps may slow down the transfer.

The apparatus and method may use proof-of-stake (POS) which may be less energy-intensive and have greater transfer throughput, speed, and capacity than other technologies. For example, PoS may use less energy than proof of work (PoW)

The apparatus and method may be stored on a blockchain, and no changes can be made or altered.

The apparatus and method may communicate and share transfer details with all transfer participants and material players.

The apparatus and method may use image recognition which may be commensurate with other image recognition approaches that do not possess some or all the previous advantages. Image recognition may be 95% or more accurate compared to other image recognition approaches that do not possess some or all the previous advantages. Image recognition may be 85% or more accurate compared to other image recognition approaches that do not possess some or all the previous advantages.

All ranges and parameters disclosed herein shall be understood to encompass all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 10.4, 3 to 8, 4 to 7), and finally to each number 1, 2, 3, 4, 5, 6, 7, 8, 10, and 10 contained within the range.

Thus, methods, apparatus, and system for conducting a secure transfer at a point of identification using image recognition and blockchain authentication have been provided. Persons skilled in the art will appreciate that the present invention can be practiced by other than the described examples, which are presented for purposes of illustration rather than of limitation. The present invention is limited only by the claims that follow.

What is claimed is:

1. A method for conducting a secure transfer at a point of identification using an extreme gradient boosting (XGBoost) image recognition machine learning model and blockchain authentication, the method comprising:
   training, using a computer processor, an XGBoost image recognition machine learning model;
   wherein the XGBoost image recognition machine learning model is trained with two or more records, where a record includes:
      one or more images of a person;
      sets of features identified in the images; and
      labels associated with the sets of features;

receiving, at the computer processor, an identity of a user and details relating to a transfer requested by the user at a point of identification;

capturing an image of the user at the point of identification;

detecting, with the computer processor running a features detection engine, sets of features in the image of the user;

running, using the computer processor, the XGBoost image recognition machine learning model to associate labels with sets of features in the image of the user;

wherein the XGBoost image recognition machine learning model uses a convolutional neural network (CNN); and matching the user with a record in a reference database, using the computer processor, by comparing sets of features identified in the image of the user and the labels associated with the sets of features with a record in the reference database;

wherein each record includes:
one or more images of a person;
sets of features identified in the images; and
labels associated with the sets of features;
sending, using the computer processor, a request to an institution where the user has an account;

wherein the institution provides the user with a secure portal to approve the transfer;

receiving, at the computer processor, the transfer from the institution indicating that the transfer was approved by the user and the institution;

wherein the user is not required to provide a phone number or an email address when requesting the transfer; and requesting, using the computer processor, a creation of a new block on a blockchain indicating completion of the transfer.

2. The method of claim 1, wherein the user has a record in the reference database.

3. The method of claim 1, wherein the transfer is processed on edge computing.

4. The method of claim 1, wherein a latency between receiving, at the computer processor, an image of the user from a point of identification with details relating to the transfer requested by the user and receiving, at the computer processor, the transfer from the institution is 45 seconds or less.

5. The method of claim 1, wherein a latency between receiving, at the computer processor, an image of the user from a point of identification with details relating to the transfer requested by the user and receiving, at the computer processor, the transfer from the institution is 15 seconds or less.

6. The method of claim 1, wherein a latency between sending, from the computer processor, a request to an institution of the user for the transfer and receiving, at the computer processor, the transfer from the institution is 5 seconds or less.

7. The method of claim 1, wherein a latency between sending, from the computer processor, a request to an institution of the user for the transfer and receiving, at the computer processor, the transfer from the institution is 1 second or less.

8. The method of claim 1, wherein the image of the user is a video of the user.

9. The method of claim 1, wherein the image of the user is a picture of the user.

10. The method of claim 1, wherein the identity of the user includes a name of the user and the details relating to the transfer requested by the user include a location of the point of identification.

11. The method of claim 1, further comprising receiving confirmation, at the computer processor, of the creation of the new block on the blockchain.

12. The method of claim 1, wherein:
the point of identification is a point of sale; and
the transfer is a transaction.

13. The method of claim 1, wherein the institution is a financial institution.

14. A method for conducting a secure transfer at a point of identification using an extreme gradient boosting (XGBoost) image recognition machine learning model and blockchain authentication, the method comprising:

receiving, at a computer processor, an identity of a user and details relating to a transfer requested by the user at a point of identification;

capturing an image of the user at the point of identification;

detecting, with the computer processor running a features detection engine, sets of features in the image of the user;

running, using the computer processor, an XGBoost image recognition machine learning model to associate labels with sets of features in the image of the user;

wherein the XGBoost image recognition machine learning model uses a convolutional neural network (CNN); and matching the user with a record in a reference database, using the computer processor, by comparing sets of features identified in the image of the user and the labels associated with the sets of features with a record in the reference database;

wherein each record includes:
one or more images of a person;
sets of features identified in the images; and
labels associated with the sets of features;
sending, using the computer processor, a request to an institution where the user has an account;

wherein the institution provides the user with a secure portal to approve a transfer;

receiving, at the computer processor, the transfer from the institution indicating that the transfer was approved by the user and the institution;

wherein the user is not required to provide a phone number or an email address when requesting the transfer;

requesting, using the computer processor, a creation of a new block on a blockchain indicating completion of the transfer; and receiving confirmation, at the computer processor, of the creation of the new block on the blockchain;

wherein:
a latency between sending, from the computer processor, a request to an institution of the user for the transfer and receiving, at the computer processor, the transfer from the institution is 1 second or less; and a latency between receiving, at the computer processor, an image of the user from a point of identification with details relating to the transfer requested by the user and receiving, at the computer processor, the transfer from the institution is 15 seconds or less.

15. The method of claim 14, wherein the transfer is processed on edge computing.

16. The method of claim 14, wherein the identity of the user includes a name of the user and the details relating to the transfer requested by the user include a location of the point of identification.

17. The method of claim 14, wherein:
the point of identification is a point of sale;
the transfer is a transaction; and
the institution is a financial institution.

18. The method of claim 14, wherein the image of the user is a video of the user or a picture of the user.

19. An apparatus for conduction of a secure transfer at a point of identification using image recognition and blockchain authentication, the apparatus comprising:
a computer processor;
a camera;
an image capturing machine;
a reference database;
an extreme gradient boosting (XGBoost) image recognition machine learning model; and
a blockchain;
wherein:
the computer processor is configured to:
receive an identity of a user and details relating to a transfer requested by the user at a point of identification;
capture an image of the user at the point of transfer using the camera and the image capturing machine;
detect, by running a features detection engine, sets of features in the image of the user;
run the XGBoost image recognition machine learning model to associate labels with sets of features identified in the image of the user, where the XGBoost image recognition machine learning model uses convolutional neural network (CNN);
match the user with a record in the reference database by comparing sets of features identified in the image of the user and the labels associated with the sets of features with a record in the reference database;
wherein each record includes:
one or more images of a person;
sets of features identified in the images; and
labels associated with the sets of features;
send a request to an institution where the user has an account to provide the user with a secure portal to approve the transfer;
receive the transfer from the institution indicating that the transfer was approved by the user and the institution;
wherein the user is not required to provide a phone number or an email address when requesting the transfer; and
request creation of a new block on the blockchain indicating completion of the transfer; and
receive confirmation of the creation of the new block on the blockchain;
wherein:
a latency between sending, from the computer processor, a request to an institution of the user for the transfer and receiving, at the computer processor, the transfer from the institution is 5 second or less; and
a latency between receiving, at the computer processor, an image of the user from a point of identification with details relating to the transfer requested by the user and receiving, at the computer processor, the transfer from the institution is 45 seconds or less.

20. The apparatus of claim 19, wherein:
the point of identification is a point of sale;
the transfer is a transaction; and
the institution is a financial institution.

* * * * *